United States Patent
Paddock et al.

(12) 
(10) Patent No.: US 6,578,967 B1
(45) Date of Patent: Jun. 17, 2003

(54) MOUNTING SYSTEM FOR BODY MOUNTED CAMERA EQUIPMENT AND CONNECTOR ASSEMBLIES THEREFOR

(75) Inventors: George K. Paddock, Los Angeles, CA (US); Jeffrey L. Clark, Valencia, CA (US)

(73) Assignee: George Paddock II, Inc., North Hollywood, CA (US)

( * ) Notice: Subject to any disclaimer, the term of this patent is extended or adjusted under 35 U.S.C. 154(b) by 0 days.

(21) Appl. No.: 09/809,536

(22) Filed: Mar. 15, 2001

(51) Int. Cl.[7] .............................................. G03B 21/00
(52) U.S. Cl. ...................... 352/243; 396/425; 439/332
(58) Field of Search ............................ 352/243; 396/12, 396/419, 420, 421, 425; 439/332, 333, 335, 337

(56) References Cited

U.S. PATENT DOCUMENTS

| 4,017,168 | A |   | 4/1977  | Brown ........................ 352/243 |
| 4,124,233 | A | * | 11/1978 | Ahlstone ..................... 285/18 |
| 4,156,512 | A |   | 5/1979  | Brown |
| 4,208,028 | A |   | 6/1980  | Brown et al. |
| 4,474,439 | A |   | 10/1984 | Brown |
| 4,496,228 | A | * | 1/1985  | Schmidt ..................... 248/161 |
| 5,005,030 | A |   | 4/1991  | Wells |
| 5,243,370 | A |   | 9/1993  | Slater |
| 5,579,071 | A |   | 11/1996 | Wetzel et al. |
| 5,685,730 | A | * | 11/1997 | Cameron et al. ............ 439/333 |
| 5,752,112 | A | * | 5/1998  | Paddock et al. ............ 352/243 |
| 5,757,996 | A | * | 5/1998  | Vine ............................ 385/59 |
| 6,010,369 | A | * | 1/2000  | Itabashi et al. ............. 439/660 |

\* cited by examiner

Primary Examiner—Russell Adams
Assistant Examiner—D. Ben Esplin
(74) Attorney, Agent, or Firm—Fulbright & Jaworski L.L.P.

(57) ABSTRACT

A mounting system for body mounted camera equipment includes a tube supported on a three-axis gimbal and having connector assemblies at each end for mounting the equipment. Each connector assembly is made up of two connectors which axially engage. One of the connectors includes grooves in the cylindrical sidewall to include radially extending pins in the other connector. The grooves each include an axial entry portion, a circumferential portion and an axial seating portion. The connectors further include an angular interlock with three pins and six sockets with the pins and sockets including mating conical surfaces. The axial pins and sockets, the grooves and the radial pins are all configured to define a locking system having an entry requiring separate axial and rotational motions of the connectors before the pins and sockets can be engaged. An axial lock including a locking ring with a threaded surface slidably and rotatably mounted on one of the connectors and a cooperating catch defined by a threaded surface on the other of the connectors is applied to keep the axial pins and sockets engaged. A central passageway extends through the connector assembly.

40 Claims, 3 Drawing Sheets

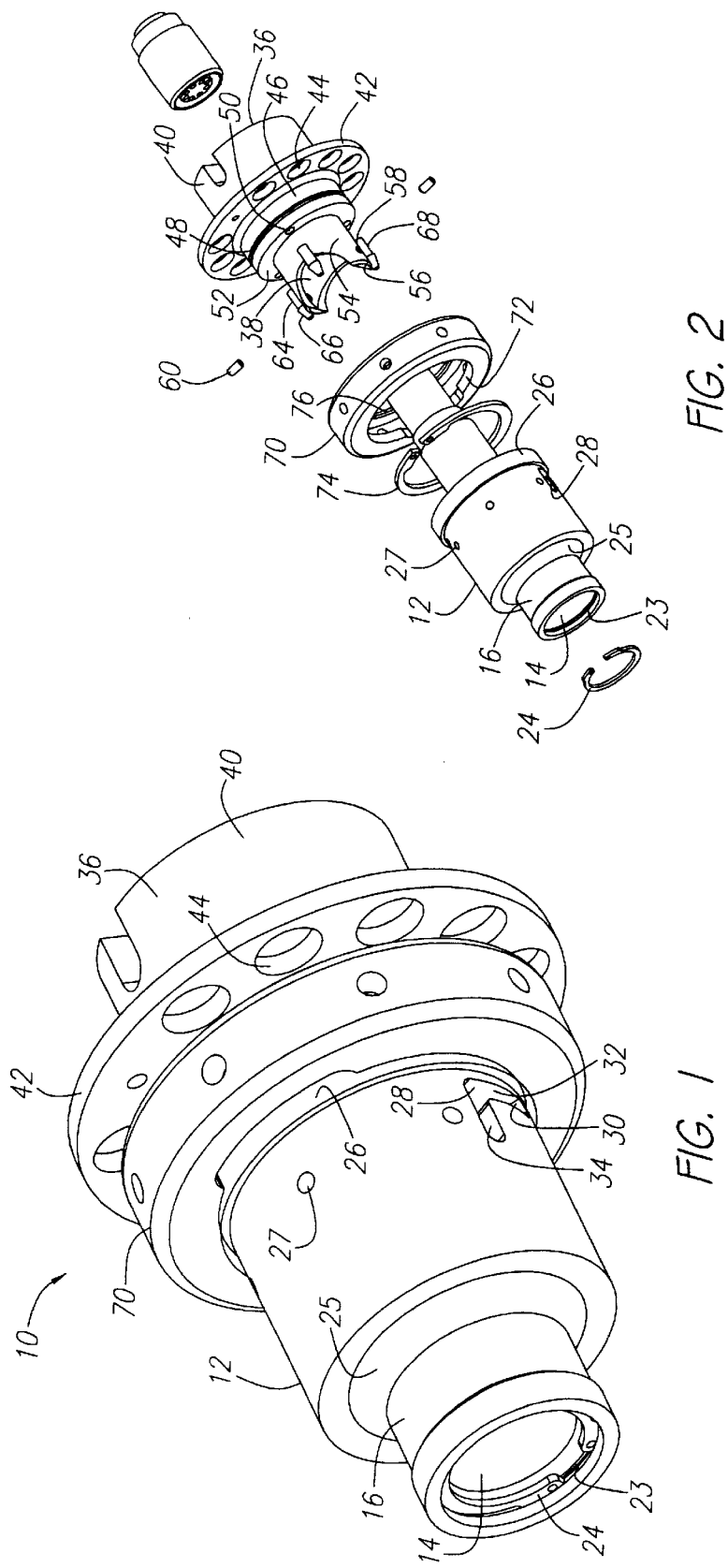

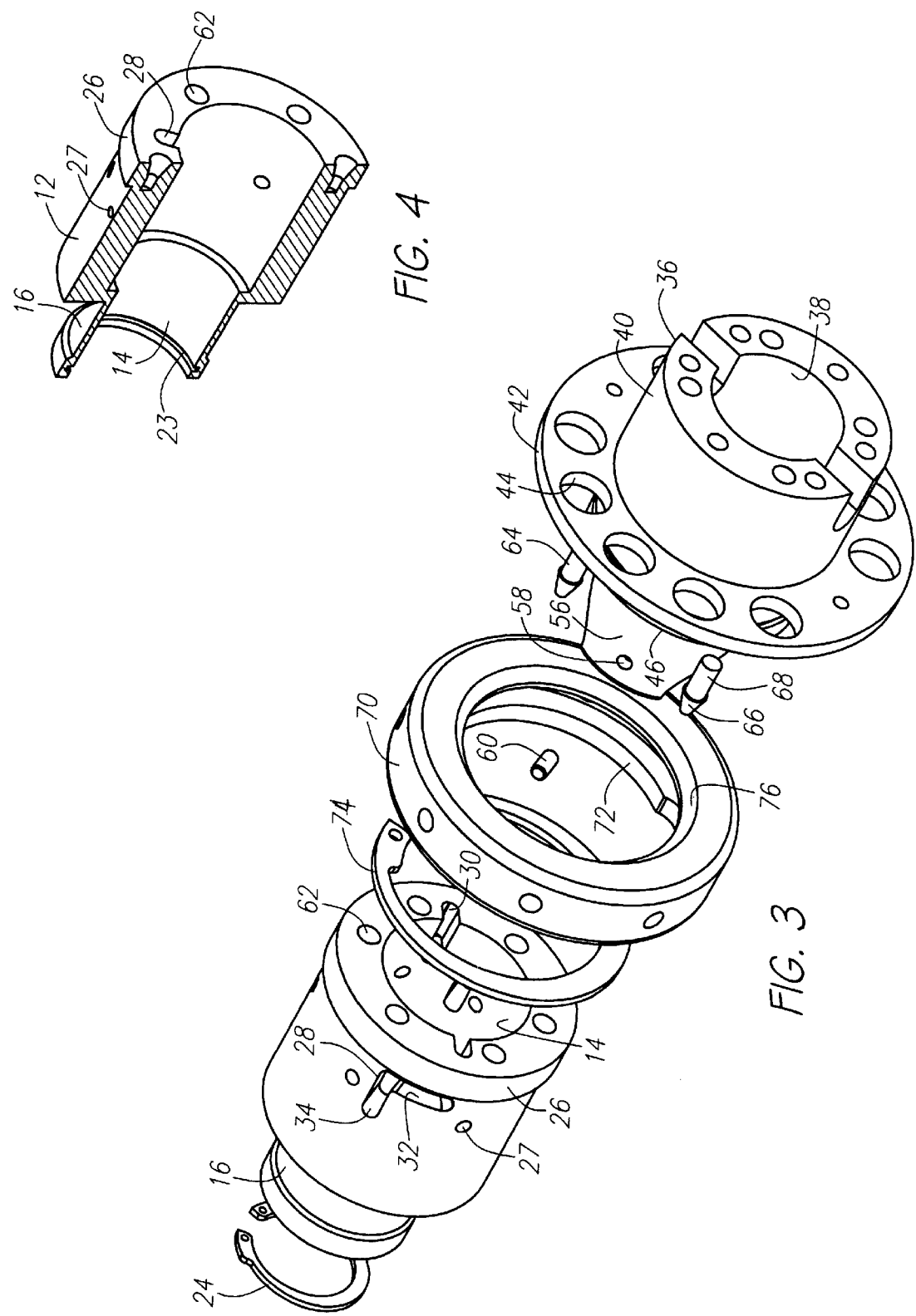

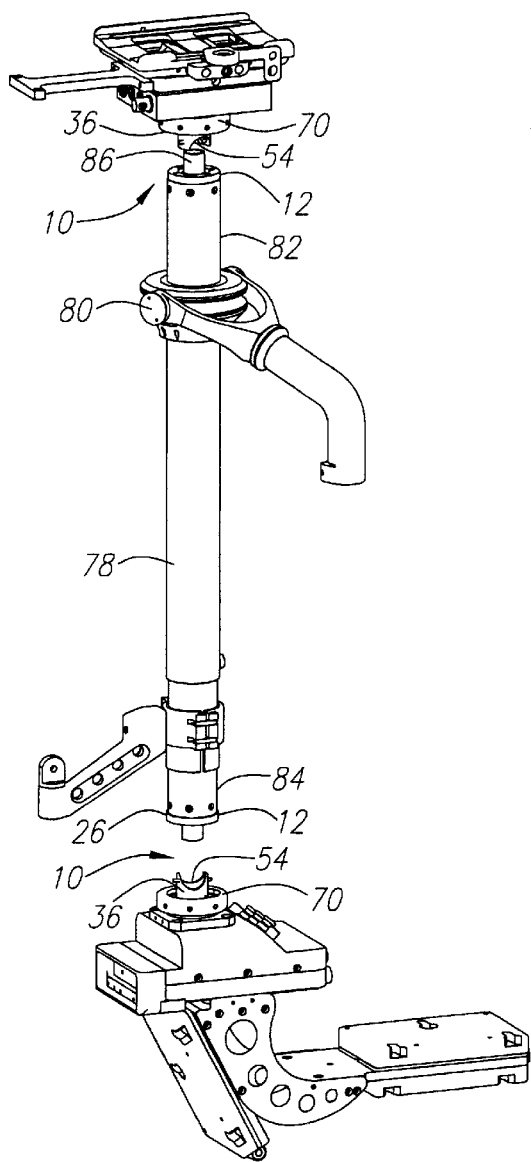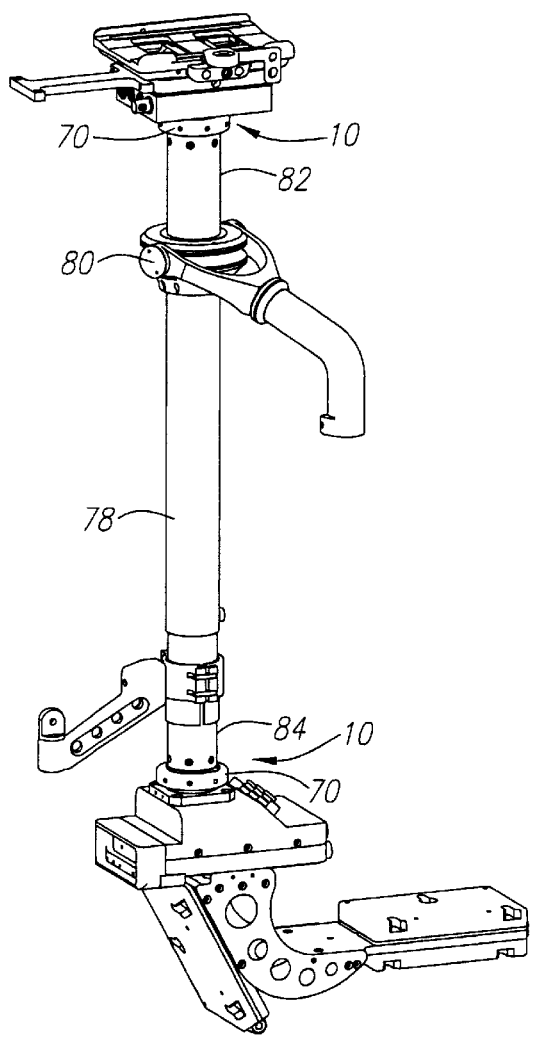
FIG. 5
FIG. 6

MOUNTING SYSTEM FOR BODY MOUNTED CAMERA EQUIPMENT AND CONNECTOR ASSEMBLIES THEREFOR

BACKGROUND OF THE INVENTION

The field of the present invention is rigid connector assemblies particularly adaptable for mounting systems used for body mounted camera equipment.

In the mid-1970's, mounting systems were developed for motion picture cameras which were used to mount the camera on the body of an operator. These systems were designed to very substantially isolate the motion of the supporting body from the camera. At the same time, the systems provided suspending support for the camera. The supported camera was capable of being lightly guided by the hand of the operator who could move the camera horizontally in all directions, either relative to his body or with his body as he moved about. The camera could also be raised or lowered with a relatively light touch. A number of patents have issued on these early systems. They include U.S. Pat. Nos. 4,017,168; 4,156,512; 4,208,028 and 4,394,075, the disclosures of which are incorporated herein by reference.

More recently, refinements to such systems have been considered. Refinements have been made in the type and variety of equipment which can be attached to such systems. Greater versatility is, therefor, of interest. A more recently developed body mounted camera support system is disclosed in U.S. Pat. No. 6,030,130, the disclosure of which is incorporated herein by reference. A gimbal for attaching the mounting system to the support arms is disclosed in U.S. Pat. No. 5,797,054, the disclosure of which is incorporated herein by reference. Various devices which can be mounted to such a mounting system are illustrated in U.S. Pat. No. 5,737,657 and U.S. Pat. No. 5,752,112, the disclosures of which are incorporated herein by reference. Connector assemblies for attaching such equipment to the mounting tube of the mounting system are also disclosed.

The environment for use of such systems is typically the movie industry. Body mounted cameras are most frequently used where there is a physical demand for irregular camera movement. One well known example of the use of such body mounted camera equipment was the chase scene through a redwood forest in the Star Wars™ movie The Return of the Jedi. A cameraman with a body mounted camera filmed his progress while walking through a redwood forest. The film was then run at high speed to achieve the effect of rapid motion. With such diverse conditions and the growing amount of equipment which can be employed on such systems, attention has been focused on the connector assemblies. A variety of attributes are of interest. Quick connect and disconnect, rigid and safe retention, tactile locking, low weight and minimum size are desired attributes for such connectors. Passage through the center of the connector for conduits and the like is also advantageous.

SUMMARY OF THE INVENTION

The present invention is directed to a connector assembly having two connectors which are axially engageable. A first coupling is provided by a cylindrical surface with grooves therein on the first connector cooperating with radial pins on the second connector. The connector assembly further includes an angular interlock and an axial lock providing additional engagement. The coupling of the grooves and the radial pins provides a first engagement with the pins in an axial entry portion of the grooves, a second engagement with the pins in a circumferential portion of the grooves and a third engagement with the pins in an axial seating portion of the grooves.

In a first separate aspect of the present invention, the angular interlock of the connector assembly includes two engaging surfaces, one on each connector. These engaging surfaces are arranged such that they remain disengaged until the third engagement of the connectors.

In a second separate aspect of the present invention, the angular interlock of the first aspect of the present invention includes angularly spaced axial pins on one connector with axial sockets on the other. The pins and sockets may include mating conical surfaces. Additionally, there may be three such pins to insure a planar engagement seat. The sockets may be provided in the integer multiples of the three pins to provide additional angular flexibility of the connectors.

In a third separate aspect of the present invention, the axial lock of the connector assembly includes a locking element which is a threaded locking ring rotatably and axially slidably mounted to one of the connectors with the other connector including a mating threaded surface for engagement with the locking element.

In a fourth separate aspect of the present invention, the connector assembly is incorporated with a mounting system for body mounted camera equipment. The connector assembly is mounted to one end of a tube which is, in turn, mounted to a three-axis gimbal intermediate the ends.

In a fifth separate aspect of the present invention, the foregoing separate aspects are contemplated to be advantageously employed in combination.

Accordingly, it is an object of the present invention to provide an improved connector assembly which is not limited to but which has particular applicability to mounting systems for body mounted camera equipment. Other and further advantages will appear hereinafter.

BRIEF DESCRIPTION OF THE DRAWINGS

FIG. 1 is an assembled perspective view of the connector assembly.

FIG. 2 is an exploded assembly view in perspective of the connector assembly of FIG. 1.

FIG. 3 is an exploded assembly view in perspective of the connector assembly of FIG. 1 viewed from a different angle from that of FIG. 2.

FIG. 4 is a cross-sectional view in perspective of a connector of the connector assembly of FIG. 1.

FIG. 5 is a partially-exploded assembly view in perspective of a mounting system for body mounted camera equipment.

FIG. 6 is an assembled perspective view of the system of FIG. 5.

DETAILED DESCRIPTION OF THE PREFERRED EMBODIMENTS

Turning in detail to the drawings, the connector assembly, generally designated 10, includes a first connector 12. The connector 12 is of generally circular cross sections normal to the axial centerline of a central passage 14 extending therethrough. The connector 12 includes an attachment section 16 and a snap ring 24 to capture a conduit connector and prevent it from retracting axially inside the central passage 14 and into the tube of a mounting system. A snap ring groove 23 may receive a snap ring 24 to provide a shoulder to prevent retraction of a conduit extending through the passage 14 and to be removable for disassembly.

The main body of the connector 12 includes a threaded outer surface 26 at the end opposite to that of the attachment section 16. The central passage 14 is cylindrical through the main body of the connector 12. The cylindrical surface of the main body of the connector 12 is able to fit within a tube of a mounting system. The raised threaded outer surface 26 provides a shoulder for the mounting tube to abut against. Holes 27 accept fasteners to retain the mounting tube attached.

Grooves, generally designated 28 are cut into the cylindrical surface of the central passage 14. Two grooves 28 are illustrated. Three or more may also be employed. The grooves 28 may best be considered as including an axial entry portion 30 which extends to the end of the connector 12. A circumferential portion 32 extends circumferentially from the axial entry portion 30. An axial seating portion 34 extends axially further into the cylinder of the connector 12 at the opposite end of the circumferential portion 32 from that of the axial entry portion 30. Thus, the axial entry portion 30 extends in a first direction from the circumferential portion 32 to the end surface of the connector 12 while the axial seating portion 34 extends in the other direction further into the body of the connector 12.

A second connector 36 is axially engageable with the first connector 12. The second connector 36 is also generally of circular cross section normal to a central passage 38 aligned with the central passage 14 when the two connectors 12 and 36 are engaged. A cylindrical attachment section 40 is associated with a mounting flange 42 having holes 44 therethrough for receiving pins or fasteners associated with various attachments for body mounted camera equipment.

A cylindrical central body 46 on the connector 36 includes a snap ring groove 48 to retain a locking element described below. Axial holes 50 are arranged about the shoulder 52 of the cylindrical central body 46. These holes 50 receive axial pins described below.

An insert 54 extends axially from the cylindrical central body 46 of the connector 36. This insert 54 mostly fits within the central passage 14 defined by the inner cylindrical surface of the connector 12. The insert 54 includes a cut away end profile to define lead-in fingers 56 to accommodate some axial misalignment when the connectors 12 and 36 are being assembled together. The lead-in fingers 56 include radial holes 58. Radial pins 60 are fixed in the radial holes 58 and are aligned for engagement with the grooves 28 of the connector 12.

An angular interlock cooperates between the connectors 12 and 36. Most basically, this angular interlock includes two engaging surfaces, one on each connector 12 and 36. One of the engaging surfaces is an axial socket 62. Six such axial sockets 62 are illustrated on the mating shoulder of the connector 12. These axial sockets 62 are angularly displaced about the annular shoulder. The other engaging surface includes axial pins 64 set within the axial holes 50. Three such axial pins 64 are used in conjunction with the six axial sockets 62. The axial pins 64 and axial sockets 62 include conical mating surfaces. On the axial pins 64, the conical surfaces 66 are shown to be truncated and associated with cylindrical mounting bodies 68 which cooperate with the axial holes 50. The conical surfaces 66 of the axial sockets 62 are not shown. They receive the pins 64 in close engagement. As three pins 64 meet with three of the sockets 62, a mounting plane is defined insuring rigid alignment of the connectors 12 and 36. The pins 64, cooperating with the sockets 62, also eliminate any relative angular displacement between the connectors 12 and 36.

The first connector 12 is shown in the preferred embodiment to have two grooves 28. These grooves 28 are diametrically opposed along with the radial pins 60 cooperating therewith. By having two grooves 28, the connectors may be assembled in either of two relative orientations. Consequently, the three axial pins 64 may be aligned with axial sockets 62 if there are enough to receive the pins 64 in two different positions. Consequently, six sockets 62 are illustrated. If there are three grooves 28, it would be possible to have three different relative orientations of the connectors 12 and 36 when assembled. However, if the pins 64 are equiangularly placed, only three sockets 62 would be necessary. Three sockets 62 would only be necessary if one groove 28 is employed while multiple alignments of the connectors would be lost. The number of grooves 28 may be increased beyond three. However, greater complications exist for the socket patterns.

The relative positioning of the axial pins 64 and sockets 62 on the connectors 12 and 36 provide for unique cooperation with the coupling provided by the radial pins 60 and grooves 28. The connectors 12 and 36 include a first engagement with the radial pins 60 in the axial entry portions 30 of the grooves 28. In this first engagement, the connectors 12 and 36 can move axially to be easily disengaged. With the radial pins 60 in the axial entry portions 30 of the grooves 28, the axial pins 64 are not engaged with the axial sockets 62. A second engagement is achieved with the radial pins 60 in the circumferential portions 32 of the grooves 28. The axial pins 64 remain disengaged from the axial sockets 62 in this second engagement. Because the circumferential portions 32 of the grooves 28 extend circumferentially, the connectors 12 and 36 can rotate relative to one another through a small angle. A third engagement is achieved with the radial pins 60 received by the axial seating portions 34 of the grooves 28. When the pins 60 are fully seated with the axial seating portions 34 in this third engagement, the axial pins 64 are engaged with the axial sockets 62. The connectors 12 and 36 can move axially from this third engagement but cannot be disengaged without subsequent relative rotation between connectors.

To retain the connectors 12 and 36 in the third engagement, an axial lock is employed between the two connectors. The axial lock includes a locking element in the form of a locking ring 70 associated with the connector 36. This locking ring 70 is rotatably mounted on the cylindrical body 46. Additionally, it is mounted in such a way as to provide limited axial motion in order to prevent damage to threaded surfaces 72 and 26 when the connectors 12 and 36 are axially engaged. The locking ring 70 includes an internally threaded surface 72. A retainer in the form of a snap ring 74 is positioned within the snap ring groove 48 on the cylindrical central body 46. A radially inwardly extending flange 76 is retained by the snap ring 74 against disassembly from the cylindrical central body 46 of the connector 36. A catch in the form of the threaded outer surface 26 on the first connector 12 cooperates with the internally threaded surface 72 on the locking ring 70. With the connectors 12 and 36 in the third engagement, the locking ring 70 can be threaded onto the threaded outer surface 26 to axially constrain the connectors 12 and 36 such that the conical surfaces 66 of the axial pins 64 and sockets 62 are compressed together. In this configuration, the connectors 12 and 36 are fully engaged.

FIGS. 5 and 6 illustrate employment of the connector assembly with a mounting system for body mounted camera equipment. The mounting system includes a tube 78 supported on a three-axis gimbal 80. The tube includes an upper end 82 and a lower end 84. Each end is shown in the embodiment to be assembled with a connector 12. Associated body mounted camera equipment is coupled with connectors 36 for advantageous mounting. A conduit 86 is shown extending through the tube 78. The conduit in this embodiment includes loops within the tube 78 so that it can be extended for coupling with the camera equipment. The connector 12 includes an inner snap ring groove 23 with a snap ring 24 that is used with a conduit connector to prevent extraction. In this embodiment, it is contemplated that the conduit 86 be independently coupled across the connector assembly 10 rather than coupled through the engagement of the assembly itself.

Accordingly, an improved connector assembly is disclosed having particular applicability for the mounting of camera equipment on a mounting system for body mounted camera equipment. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A connector assembly comprising
    a first connector including a cylindrical surface having grooves therein, the grooves each having an axial entry portion, a circumferential portion extending from the axial entry portion and an axial seating portion extending from the cylindrical portion and displaced circumferentially from the axial entry portion, the axial entry portion and the axial seating portion extending from the circumferential portion in opposite directions;
    a second connector axially engageable with the first connector and including radial pins aligned for engagement with the grooves;
    an angular interlock including a first engaging surface on the first connector and a second engaging surface on the second connector, the first connector and the second connector having a first engagement with the radial pins in the axial entry portion of the grooves and the first engaging surface and the second engaging surface being angularly disengaged, a second engagement with the radial pins in the circumferential portion and the first engaging surface and the second engaging surface being angularly disengaged and a third engagement with the radial pins in the axial seating portion and the first engaging surface and the second engaging surface being angularly engaged;
    an axial lock including a locking element on one of the first and second connectors and a catch on the other of the first and second connectors.

2. The connector assembly of claim 1, the first engaging surface being at least one axial socket and the second engaging surface being at least one axial pin.

3. The connector assembly of claim 2, the at least one axial socket being on the first connector and the at least one axial pin being on the second connector.

4. The connector assembly of claim 2, the at least one axial socket and the at least one axial pin each including a conical mating surface.

5. The connector assembly of claim 1, the first and second connectors each having a central passage therethrough.

6. The connector assembly of claim 5, the second connector further including an insert extending axially from about the central passage therethrough and closely fitting within the central passage of the first connector, the radial pins being on the insert.

7. The connector assembly of claim 6, the insert including fingers.

8. The connector assembly of claim 1, the locking element being a locking ring having a first threaded surface and being rotatably mounted and axially slidably mounted on the one of the first and second connectors, the catch being a second threaded surface on the other of the first and second connectors and threadably engageable with the first threaded surface with the first and second connectors in the third engagement.

9. The connector assembly of claim 8 further comprising,
    a retainer axially fixed on the one of the first and second connectors with the locking ring mounted thereon, the locking ring being axially slidably mounted to against the retainer.

10. The connector assembly of claim 9, the retainer including a circumferential groove and a snap ring.

11. The connector assembly of claim 9, the second connector including the locking ring and the retainer.

12. A connector assembly comprising
    a first connector including a cylindrical surface having grooves therein, the grooves each having an axial entry portion, a circumferential portion extending from the axial entry portion and an axial seating portion extending from the cylindrical portion and displaced circumferentially from the axial entry portion, the axial entry portion and the axial seating portion extending from the circumferential portion in opposite directions;
    a second connector axially engageable with the first connector and including radial pins aligned for engagement with the grooves;
    an angular interlock including axial sockets on one of the first and second connectors and axial pins on the other of the first and second connectors, the first connector and the second connector having a first engagement with the radial pins in the axial entry portion of the grooves and the axial sockets and the axial pins being angularly disengaged, a second engagement with the radial pins in the circumferential portion and the axial sockets and the axial pins being angularly disengaged and a third engagement with the radial pins in the axial seating portion and the axial sockets and the axial pins being angularly engaged;
    an axial lock including a locking element on one of the first and second connectors and a catch on the other of the first and second connectors.

13. The connector assembly of claim 12, each of the axial sockets and each of the axial pins including a conical mating surface.

14. The connector assembly of claim 12, there being at least three angularly spaced axial pins.

15. The connector assembly of claim 14, there being more than three axial sockets.

16. A connector assembly comprising
    a first connector including a cylindrical surface having grooves therein, the grooves each having an axial entry portion, a circumferential portion extending from the axial entry portion and an axial seating portion extending from the cylindrical portion and displaced circumferentially from the axial entry portion, the axial entry portion and the axial seating portion extending from the circumferential portion in opposite directions;
    a second connector axially engageable with the first connector and including radial pins aligned for engagement with the grooves;
    an angular interlock including axial sockets on one of the first and second connectors and axial pins on the other of the first and second connectors, the first connector and the second connector having a first engagement with the radial pins in the axial entry portion of the grooves and the axial sockets and the axial pins being angularly disengaged, a second engagement with the radial pins in the circumferential portion and the axial sockets and the axial pins being angularly disengaged and a third engagement with the radial pins in the axial seating portion and the axial sockets and the axial pins being angularly engaged;

an axial lock including a locking element on one of the first and second connectors, and a catch on the other of the first and second connectors;

the connector assembly having three angularly spaced axial pins and six axial sockets.

17. The connector assembly of claim 16, each of the axial sockets and each of the axial pins including a conical mating surface.

18. The connector assembly of claim 12, the first and second connectors each having a central passage therethrough.

19. The connector assembly of claim 18, the second connector further including an insert extending axially from about the central passage therethrough and closely fitting within the central passage of the first connector, the radial pins being on the insert.

20. The connector assembly of claim 19, the insert including lead-in fingers.

21. The connector assembly of claim 12, the locking element being a locking ring having a first threaded surface and being rotatably mounted and axially slidably mounted on the one of the first and second connectors, the catch being a second threaded surface on the other of the first and second connectors and threadably engageable with the first threaded surface with the first and second connectors in the third engagement.

22. The connector assembly of claim 21 further comprising, a retainer axially fixed on the one of the first and second connectors with the locking ring mounted thereon, the locking ring being axially slidably mounted to against the retainer.

23. The connector assembly of claim 22, the retainer including a circumferential groove and a snap ring.

24. The connector assembly of claim 22, the second connector including the locking ring and the retainer.

25. A connector assembly comprising a first connector including a first internal cylindrical surface having equiangularly spaced grooves therein and defining a first central passage therethrough, the grooves each having an axial entry portion, a circumferential portion extending from the axial entry portion and an axial seating portion extending from the cylindrical portion and displaced circumferentially from the axial entry portion, the axial entry portion and the axial seating portion extending from the circumferential portion in opposite directions;

a second connector axially engageable with the first connector and including equiangularly spaced pins extending radially outwardly and aligned for engagement with the grooves, a second central passage therethrough and an insert extending axially from about the second central passage and closely fitting within the first central passage, the radial pins being on the insert;

an angular interlock including at least two sets of three axial sockets on one of the first and second connectors and three axial pins on the other of the first and second connectors, each of the axial sockets and each of the axial pins including a conical mating surface, the first connector and the second connector having a first engagement with the radial pins in the axial entry portion of the grooves and the axial sockets and the axial pins being disengaged, a second engagement with the radial pins in the circumferential portion and the axial sockets and the axial pins being disengaged and a third engagement with the radial pins in the axial seating portion and the axial sockets and the axial pins being engaged;

an axial lock including a locking element on one of the first and second connectors and a catch on the other of the first and second connectors.

26. The connector assembly of claim 25, the insert including lead-in fingers.

27. The connector assembly of claim 25, the locking element being a locking ring having a first threaded surface and being rotatably mounted and axially slidably mounted on the one of the first and second connectors, the catch being a second threaded surface on the other of the first and second connectors and threadably engageable with the first threaded surface with the first and second connectors in the third engagement.

28. The connector assembly of claim 27 further comprising, a retainer axially fixed on the one of the first and second connectors with the locking ring mounted thereon, the locking ring being axially slidably mounted to against the retainer.

29. The connector assembly of claim 28, the retainer including a circumferential groove and a snap ring.

30. The connector assembly of claim 28, the second connector including the locking ring and the retainer.

31. A mounting system for body mounted camera equipment comprising a tube having an upper end, a lower end and a three-axis gimbal intermediate the upper and lower ends;

a connector assembly mounted to one of the upper and lower ends of the tube and including a first connector having a cylindrical surface having grooves therein, the grooves each having an axial entry portion, a circumferential portion extending from the axial entry portion and an axial seating portion extending from the cylindrical portion and displaced circumferentially from the axial entry portion, the axial entry portion and the axial seating portion extending from the circumferential portion in opposite directions, a second connector axially engageable with the first connector and having radial pins aligned for engagement with the grooves, an angular interlock having a first engaging surface on the first connector and a second engaging surface on the second connector, the first connector and the second connector having a first engagement with the radial pins in the axial entry portion of the grooves and the first engaging surface and the second engaging surface being disengaged, a second engagement with the radial pins in the circumferential portion and the first engaging surface and the second engaging surface being disengaged and a third engagement with the radial pins in the axial seating portion and the first engaging surface and the second engaging surface being engaged, an axial lock including a locking element on one of the first and second connectors and a catch on the other of the first and second connectors.

32. The mounting system for body mounted camera equipment of claim 31, a connector assembly mounted to the other of the upper and lower ends of the tube and including a first connector having a cylindrical surface having grooves therein, the grooves each having an axial entry portion, a circumferential portion extending from the axial entry portion and an axial seating portion extending from the cylindrical portion and displaced circumferentially from the axial entry portion, the axial entry portion and the axial seating portion extending from the circumferential portion in opposite directions, a second connector axially engageable with the first connector and having radial pins aligned for engagement with the grooves, an angular interlock having a first engaging surface on the first connector and a second engaging surface on the second connector, the first connector and the second connector having a first engagement with the radial pins in the axial entry portion of the grooves and the first engaging surface and the second engaging surface being angularly disengaged, a second engagement with the radial pins in the circumferential portion and the first engaging surface and the second engaging surface being angularly disengaged and a third engagement with the radial pins in the axial seating portion and the first engaging surface and the second engaging surface being angularly engaged, an axial lock including a locking element on one of the first and second connectors and a catch on the other of the first and second connectors.

33. The mounting system for body mounted camera equipment of claim 31, the first and second connectors each having a central passage therethrough.

34. The mounting system for body mounted camera equipment of claim 33, the second connector further including an insert extending axially from about the central passage therethrough and closely fitting within the central passage of the first connector, the radial pins being on the insert.

35. The mounting system for body mounted camera equipment of claim 31, the locking element being a locking ring having a first threaded surface and being rotatably mounted and axially slidably mounted on the one of the first and second connectors, the catch being a second threaded surface on the other of the first and second connectors and threadably engageable with the first threaded surface with the first and second connectors in the third engagement.

36. The mounting system for body mounted camera equipment of claim 35 further comprising,
   a retainer axially fixed on the one of the first and second connectors with the locking ring mounted thereon, the locking ring being axially slidably mounted to against the retainer.

37. The mounting system for body mounted camera equipment of claim 36, the retainer including a circumferential groove and a snap ring.

38. The mounting system for body mounted camera equipment of claim 36, the second connector including the locking ring and the retainer.

39. The mounting system for body mounted camera equipment of claim 31 further comprising
   a cable extending through the tube and the connector assembly.

40. A mounting system for body mounted camera equipment comprising
   a tube having an upper end, a lower end and a three-axis gimbal intermediate the upper and lower ends;
   a connector assembly mounted to one of the upper and lower ends of the tube and including a first connector having a first internal cylindrical surface having equiangularly spaced grooves therein and defining a first central passage therethrough, the grooves each having an axial entry portion, a circumferential portion extending from the axial entry portion and an axial seating portion extending from the cylindrical portion and displaced circumferentially from the axial entry portion, the axial entry portion and the axial seating portion extending from the circumferential portion in opposite directions, a second connector axially engageable with the first connector and having equiangularly spaced pins extending radially outwardly and aligned for engagement with the grooves, a second central passage therethrough and an insert extending axially from about the second central passage and closely fitting within the first central passage, the radial pins being on the insert, an angular interlock having at least two sets of three axial sockets on one of the first and second connectors and three axial pins on the other of the first and second connectors, each of the axial sockets and each of the axial pins including a conical mating surface, the first connector and the second connector having a first engagement with the radial pins in the axial entry portion of the grooves and the axial sockets and the axial pins being disengaged, a second engagement with the radial pins in the circumferential portion and the axial sockets and the axial pins being disengaged and a third engagement with the radial pins in the axial seating portion and the axial sockets and the axial pins being engaged, an axial lock including a locking element on one of the first and second connectors and a catch on the other of the first and second connectors, the locking element being a locking ring having a first threaded surface and being rotatably mounted and axially slidably mounted on the one of the first and second connectors, the catch being a second threaded surface on the other of the first and second connectors and threadably engageable with the first threaded surface with the first and second connectors in the third engagement;
   a retainer axially fixed on the one of the first and second connectors with the locking ring mounted thereon, the locking ring being axially slidably mounted to against the retainer.

* * * * *